United States Patent
Smith et al.

(10) Patent No.: US 7,769,802 B2
(45) Date of Patent: Aug. 3, 2010

(54) SYSTEMS AND METHODS THAT EMPLOY CORRELATED SYNCHRONOUS-ON-ASYNCHRONOUS PROCESSING

(75) Inventors: Kevin B. Smith, Sammamish, WA (US);
Derek N. LaSalle, Redmond, WA (US);
Akash J. Sagar, Redmond, WA (US);
Jean-Emile Elien, Bellevue, WA (US);
Johannes Klein, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1395 days.

(21) Appl. No.: 10/728,042

(22) Filed: Dec. 4, 2003

(65) Prior Publication Data

US 2005/0125508 A1 Jun. 9, 2005

(51) Int. Cl.
*G06F 15/16* (2006.01)
*G06F 15/173* (2006.01)
*G06F 9/46* (2006.01)
*G06F 11/00* (2006.01)

(52) U.S. Cl. .................. 709/201; 709/238; 718/105; 714/11

(58) Field of Classification Search ............... 709/201, 709/238; 714/11; 718/105
See application file for complete search history.

(56) References Cited

U.S. PATENT DOCUMENTS

| | | | |
|---|---|---|---|
| 5,867,706 A * | 2/1999 | Martin et al. ............... 718/105 |
| 5,923,890 A | 7/1999 | Kubala et al. | |
| 6,023,722 A | 2/2000 | Colyer | |
| 6,134,588 A | 10/2000 | Guenthner et al. | |
| 6,141,759 A * | 10/2000 | Braddy ....................... 726/14 |
| 6,223,205 B1 * | 4/2001 | Harchol-Balter et al. .... 718/105 |
| 6,430,618 B1 * | 8/2002 | Karger et al. ............... 709/225 |
| 6,510,431 B1 | 1/2003 | Eichstaedt et al. | |
| 6,516,337 B1 * | 2/2003 | Tripp et al. ................. 709/202 |
| 2002/0078174 A1 * | 6/2002 | Sim et al. ................... 709/219 |
| 2004/0064568 A1 * | 4/2004 | Arora et al. ................. 709/228 |
| 2004/0153440 A1 * | 8/2004 | Halevy et al. ................. 707/3 |

OTHER PUBLICATIONS

D. Andresen, T. Yang. Adaptive Scheduling with Client Resources to Improve WWW Server Scalability, UCSB TRCS96-27. 25 pages.
B. Charron-Bost, F. Mattern, and G. Tel. Synchronous, asynchronous, and causally ordered communications. Distributed Computing, 1995. 22 pages.

* cited by examiner

*Primary Examiner*—Ranodhi N Serrao
(74) *Attorney, Agent, or Firm*—Workman Nydegger

(57) ABSTRACT

The present invention provides a novel technique for Web-based asynchronous processing of synchronous requests. The systems and methods of the present invention utilize a synchronous interface in order to couple with systems that synchronously communicate (e.g., to submit queries and receive results). The interface enables reception of synchronous requests, which are queued and parsed amongst subscribed processing servers within a server farm. Respective servers can serially and/or concurrently process the request and/or portions thereof via a dynamic balancing approach. Such approach distributes the request to servers based on server load, wherein respective portions can be re-allocated as server load changes. Results can be correlated with the request, aggregated, and returned such that it appears to the requester that the request was synchronously serviced. The foregoing mitigates the need for clients to perform client-side aggregation of asynchronous results.

4 Claims, 11 Drawing Sheets

SYSTEMS AND METHODS THAT EMPLOY CORRELATED SYNCHRONOUS-ON-ASYNCHRONOUS PROCESSING

TECHNICAL FIELD

The present invention generally relates to Web services, and more particularly to systems and methods that asynchronously service synchronous requests.

BACKGROUND OF THE INVENTION

A computer network typically comprises a plurality of computers and software and hardware that facilitate interaction between at least two computers in order to provide a fast, efficient and cost effective means to obtain and/or exchange information. In many instances, other microprocessor-based devices such as printers, plotters, scanners, facsimile machines, databases, and servers are coupled to the network, via a direct connection or through another device, to provide additional capabilities and/or enhance user experience. The above-noted benefits typically are exploited by corporations, medical facilities, businesses, the government, and educational facilities, for example, wherein various types of computer networks are employed to improve everyday tasks such as correspondence (e.g., via email, instant messaging and chat rooms), documentation, problem solving, mathematical computation, scheduling, planning, budgeting, reporting, and information gathering.

The various types of computer networks usually are categorized and differentiated through characteristics such as size and user base, topology, and architecture. Two commonly utilized categorizations include Local Area Network (LAN) and Wide Area Network (WAN). A LAN generally is associated with a relatively small geographic area such a department, building or group of buildings, and employed to connect local workstations, personal computers, printers, copiers, scanners, etc. A WAN typically is associated with networks that span large geographical areas, and can include one or more smaller networks, such as one or more LANs. For example, a WAN can be employed to a couple computers and/or LANs that reside on opposite ends of a country and/or world. The most popular WAN today is the Internet.

Increased demand for user configurable networks that enable a user to personalize a network to meet particular user needs and/or to optimize such networks for particular environments has lead to further, but lesser known, user base delineations. For example, campus area networks (CANs) typically are associated with universities or military bases, wherein a user groups with similar and specialized needs (e.g., educational, training, etc.) exists within a limited base. Metropolitan area networks (MANs) are designed for townships, cities, counties, etc., wherein the needs of the user group are generic, but common to the locality. Home area networks (HANs) are becoming more and more popular and provide a home owner a mechanism to couple, control and monitor utilities (e.g., lighting and temperature), entertainment centers (e.g., audio and video systems) and security (e.g., alarm and CCD cameras) systems.

Common computer network topologies include bus, ring and star. With a bus topology, a central channel or backbone (the bus) couples computers and/or devices on the network. Computers coupled to the network can communicate directly with one another over the bus. In a ring topology, computers and/or devices are coupled as a closed loop. Thus, information may travel through several computers in order to convey information from one computer to another. Computers within a star topology are connected to a central computer such that any communication between computers occurs via the central computer.

Architectural differentiation includes a peer-to-peer and client-server networks. With a peer-to-peer architecture, computers are connected to one another (e.g., via a hub) and share the same level of access on the network. In addition, the computers can be configured with security levels and/or sharing rights such that files can be directly accessed and shared peer-to-peer, or between computers. In contrast, a client-server network comprises at least one client machine, which can be a user's computer, and a server, which typically is employed to store and execute shared applications. One advantage of employing a client-server configuration is that it can free local disk space on clients by providing a central location for file storage and execution.

Client-server architectures are particularly useful with database systems, wherein volumes of information can be stored (e.g., via a plurality of tables) within a server(s) that can be accessed by a client via a query. Conventional and legacy client-server systems typically are synchronous systems, wherein the client transmits a synchronous request that is synchronously serviced by the server. Demand for greater quantities of information, increased data rates and multi-request capabilities lead to the development of various server-side processing improvements such as asynchronous and parallel processing. However, in order for such techniques to be employed in connection with clients that communicate synchronously (e.g., submit synchronous requests and expect synchronous results), clients are required to implement routines that can receive a plurality of asynchronous results on the client-side. Such client-side routines manage mapping results to a corresponding query and combing such results to simulate synchronous processing; and thus, can consume client processing cycles and memory, and add to client overhead.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that asynchronously process synchronous requests with a Web-based service. In general, a client that interacts via synchronous communication can submit a synchronous query that can be delineated amongst Web server engines that process the request. Such processing is achieved asynchronously by parsing the request across respective server engines, wherein one or more server engines serially and/or concurrently process respective portions of the request. Parsing can be based on dynamic load balancing techniques, wherein portions of the request are provided to server engines based on server engine load in order to equalize processing across the server engines. Respective server engines return asynchronous results that are grouped to an associated request. Thus, multiple requests can be processed wherein results can be discriminated to aggregate results with associated queries. Aggregated asynchronous results can be returned to the client such that it appears that the request was synchronously processed.

Thus, the present invention provides a novel technique that exploits the advantages of asynchronous processing (e.g., scaling out, greater through-put, etc.) to improve performance while mitigating the need for client side software that aggregates results in order to simulate synchronous processing. Thus, the present invention provides for efficient and seamless asynchronous processing that is transparent to a requestor. Conventional systems typically require a client application to correlate asynchronous results and do not utilize Web-based asynchronous processing services. Thus, the present invention provides for an improvement over such conventional systems via mitigating client-based correlation schemes and enabling seamless Web-based asynchronous processing.

In one aspect of the present invention, a system is provided that facilitates asynchronous (e.g., Web-based) servicing of synchronous requests. The system includes an interface that can be utilized to interact with clients that communicate synchronously. Such clients can submit a synchronous request, which can be received and stored within a queue. Additional information related to the request can be stored in the queue to facilitate tracking and returning results. Process engines can subscribe to the queue in order to retrieve and process stored requests. In general, the system can employ a load balancing approach wherein the request and/or portions thereof are provided to process engines based on process engine load. Thus processing power can be optimized by the efficient utilization of the process engines. In addition, the load distribution can be dynamic such that as process engine load changes, the request and/or portions thereof can be conveyed between process engines. Asynchronous results can be correlated with a corresponding request, grouped, and returned to the requester as a synchronous result.

In another aspect of the present invention, a system that asynchronously processes synchronous requests is illustrated. The system comprises an adapter (e.g., a pluggable component and object instance) that interfaces with clients that interact via synchronous communication. The system further comprises an API that can be utilized to convey a request from the adapter to a process engine. The process engine facilitates routing the request and/or portions thereof to a plurality of process units that service the request. The plurality of process units can serially and/or concurrently service the request and/or portions thereof based on a dynamic balancing approach, wherein the request can dynamically delineated across process units to achieve approximate load equilibrium. Asynchronous results can be aggregated based on a correlation technique and subsequently routed to the client as a synchronous request via the API and adapter.

In yet another aspect of the present invention, a Web-based asynchronous process service is illustrated. The Web service enables a client to provide a synchronous query after establishing an on-line session and connecting to the Web service. Such a session can be achieved via a Web browser. After submitting the synchronous request, the processing service can dynamically and asynchronously service the request via one or more service engines that have subscribed to service requests. Such servicing can include partial processing by respective service engines, including serial processing wherein the request is conveyed between service engines based on engine load and/or parallel processing wherein the request can be parsed and distributed across a plurality of service engines to be processed. Asynchronous results can be aggregated by request and returned as a synchronous result to the client.

In still other aspects of the present invention, methodologies are provided for asynchronously processing synchronous requests. The methodologies comprise receiving, posting, obtaining and processing a synchronous request, wherein synchronous results are returned, grouped, and returned as a synchronous result. Moreover, exemplary networking and operating environments wherein the novel aspect of the invention can be employed are depicted.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
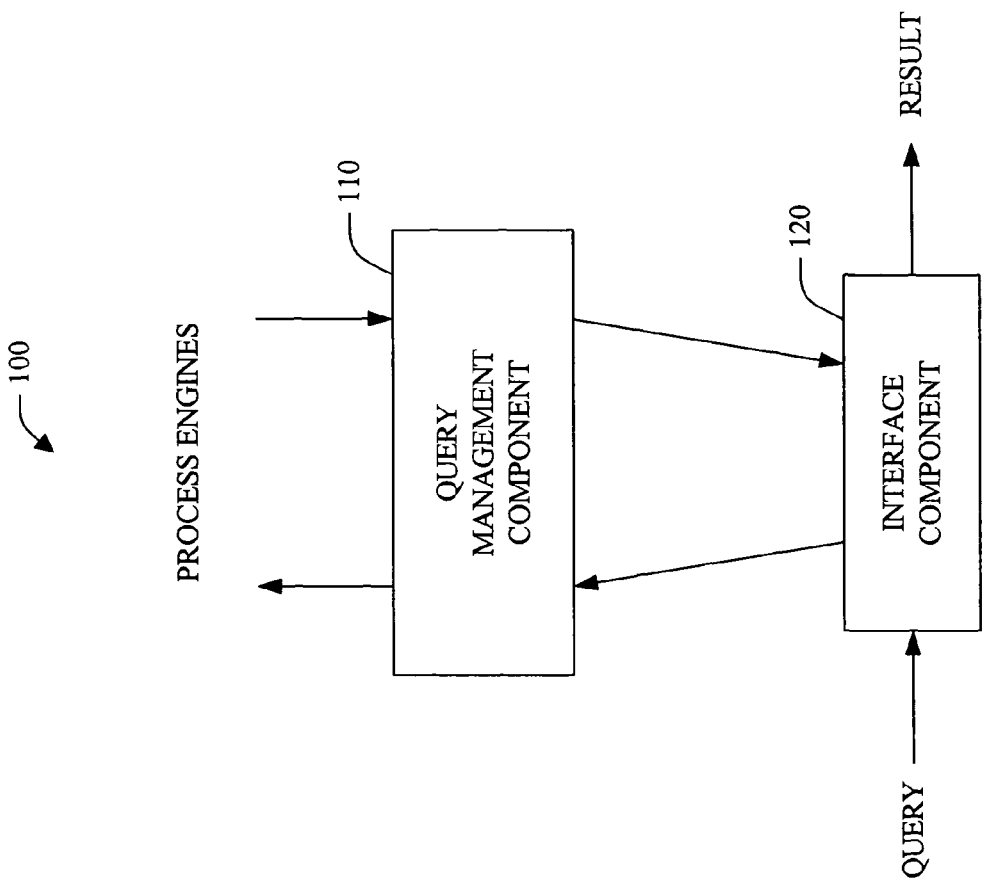
FIG. 1 illustrates an exemplary system that facilitates Web-based dynamic asynchronous servicing of synchronous requests, in accordance with an aspect of the present invention.

The present invention relates to systems and methods that provide Web-based asynchronous processing of synchronous requests. Such systems and methods enable a client that interacts synchronously to transmit a synchronous request that can be efficiently and transparently processed utilizing an asynchronous technique. For example, the synchronous request can be farmed out, or scaled across Web processing engines in order to leverage the advantages associated with asynchronous processing. The novel systems and methods employ a dynamic balancing approach to parse and delineate the synchronous request across the Web processing engines. Respective asynchronous results (including errors) can be correlated with an associated synchronous request, aggregated, and returned to the requester as a synchronous result. The systems and methods additionally allow a processing server to act as a client for another processing server within the context of the original request from the client. Thus various distributed Web services can process a request.

The foregoing provides for improvements over conventional synchronous systems that execute client-side software that accepts asynchronous results and groups such results on the client in order to simulate synchronous processing. Such software can consume resources such processing cycles and memory, impact performance, and increase overhead. Thus, the present invention provides a novel technique that exploits the advantages of asynchronous processing (e.g., scaling out, greater through-put, etc.) while mitigating work-around patches that simulate synchronous processing for asynchronous results. Moreover, the systems and methods provide for seamless asynchronous processing that is transparent to the client.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a computer component. In addition, one or more components can reside within a process and/or thread of execution, and a component can be localized on one computer and/or distributed between two or more computers. Furthermore, a component can be entity (e.g., within a process) that an operating system kernel schedules for execution. Moreover, a component can be associated with a "context" (e.g., the contents within system registers), which can be volatile and/or non-volatile data associated with the execution of the thread.

FIG. 1 illustrates a system 100 that facilitates servicing synchronous requests with a Web-based asynchronous processing technique, in accordance with an aspect of the present invention. The system 100 comprises a query management component 110 that facilitates delineating a synchronous request across a plurality of processing engines and an interface component 120 that receives a request, conveys the request to the query management component 110 and returns a synchronous result.

The query management component 110 accepts synchronous and/or asynchronous requests ("requests") received by the interface component 120. Typically, such requests can comprise and/or be conveyed with information indicative of a client and/or the interface component 120. Such information can be utilized to return results to the client via the interface component 120 and/or via another interface component (not shown). Upon receiving the request, the query management component 110 can publish the request. For example, the request can be stored in a message box or queue. Such publication can be utilized to notify any process engine that has subscribed to the query management component 110 that a request has been received. In addition, processing engines that subscribe after the request is received can obtain such notification.

Subscribed process engines can compete for the request and/or portions thereof, wherein the query management component 110 can facilitate distributing the request across one or more competing process engines. For example, in one aspect of the present invention the query management component 110 can facilitate detecting processing engine computing power, capacity, present load, and expected future load, for example. Such information can be employed to determine which processing engine(s) should contribute with processing the request. For example, in one instance, the request can be parsed amongst process engines for asynchronous processing based on a present load of the respective process engines. For example, a process engine with the lowest load can be provided with portions of the request until that process engine no longer is associated with the lowest load. Instead of providing further portions of the request to this process engine, another process engine with the present lowest load can begin receiving portions of the request. Alternatively, such distribution can be achieved concurrently; portions of the request can be distributed concurrently, for example, in proportion to available load. The foregoing can be utilized to distribute all or substantially all portions of the request.

In another instance, the request can be parsed amongst process engines for asynchronous processing based on any combination of computing power, capacity, present load and expected future load, and optionally other factors. Thus, the process engine that is expected to become the lowest load process engine or the process engine with the most processing power can be selected to begin processing portions of the request. In yet another instance, more than one process engine can be employed to process the same or a similar portion of the request, wherein the first result returned typically is employed. Subsequent results can be discarded, utilized for error checking, employed in place of the first result and/or additionally utilized, for example, when multiple responses to a single request is desired. Moreover, returning the first result can invoke a trigger that halts processing of the request by other process engine.

Any subscribed process engine can additionally transfer/receive the request or portion of the request to/from another process engine. Thus, as a process engine's load decreases, for example, upon returning results and/or halting processing, the process engine can be provided with another portion(s) of the request, including portions that have been partially processed, from either the query management component 110 and/or other process engines. Such technique provides for dynamic equilibrium, wherein portions of a request can be periodically (e.g., via in real-time, after a preset time, and upon reaching a load threshold) conveyed between process engines in order to balance processing across process engines.

In addition, the novel technique can ensure that the request is processed when a process engine fails (e.g., via an error handling component), wherein the portion of the request being serviced by a failed process engine can simply be conveyed to another process engine and/or machine for servicing. Thus, request processing can continue on a different machine, wherein the client need not be aware of the system failure. The foregoing provides for failover. In other aspects of the invention, the client can be notified of such failures, and, in addition, the client can be notified of failures resulting from a database becoming inoperable, a communication channel interruption, a malicious instruction(s) (e.g., a virus), a system shutdown, a cancelled request, an expired timer, etc. It is to be appreciated the in other instances, a process engine failure and/or a client notified of such failure can halt servicing such that request servicing is terminated.

Results from the process engines can be returned to the query management component 110, wherein the query management component 110 can correlate results with a request in order to facilitate returning a synchronous result to the client. As noted above, the request can comprise and/or be conveyed to the query management component 110 with information indicative of the client and/or the interface component 120 such that results can be returned to the client via the interface component 120 and/or via another interface component (not shown). In addition, any portions of the request that are provided to respective process engines can include and/or be conveyed with information indicative of the request and/or the query management component 110 to facilitate returning results to the query management component 110 and correlating returned results.

It is to be appreciated that providing such information with portions of the request enables results to be returned to the query management component 110 via various paths. For example, a portion of the request that has been serviced via multiple process engines can be returned through such process engines in a reverse order in which the portion is processed or in any order (e.g., an order determined to be most efficient, for example, based on load). In another example, the portion serviced via the multiple process engines can be returned by the last process engine to process a portion, via any of the process engines that contributed to processing the portion or through one or more process engines that did not contribute to processing.

The interface component 120 can be utilized to couple one or more clients (e.g., client machines) with the query management component 110, wherein the interface component 120 can serially and/or concurrently receive and/or convey synchronous requests and/or results. It is to be appreciated that such coupling can be achieved in connection with a network (e.g., an intranet, an internet and the Internet). Thus, a Web client can communicate with the query management component 110 and submit a synchronous request that can be asynchronously serviced, as described in detail above, wherein the request can be dynamically dispersed and seamlessly processed amongst process engines. Returned results can be correlated, aggregated and returned to the Web client in a synchronous manner. The foregoing provides for scaling out over a process engine farm for increased performance and throughput.

Conventional systems that utilize asynchronous processing to service synchronous requests typically require a client application to correlate asynchronous responses in order to simulate synchronous behavior and are not Web-based. For example, conventional systems can implement topic based addressing as a subscription-matching scheme, which requires a client application to create runtime subscriptions for correlation to occur. Thus, the present invention provides for an improvement over such conventional systems via mitigating client-based correlation of asynchronous results. In addition, and unlike many conventional systems, the foregoing can be utilized with Web-based services to seamlessly process in an asynchronous manner transparent to the requestor. In addition, many conventional systems, legacy systems and Web services expect synchronous interaction. Since the present invention provides for transparent and seamless asynchronous processing, the present invention is backwards compatible and can be utilized in connection with such systems.

Figure 2:
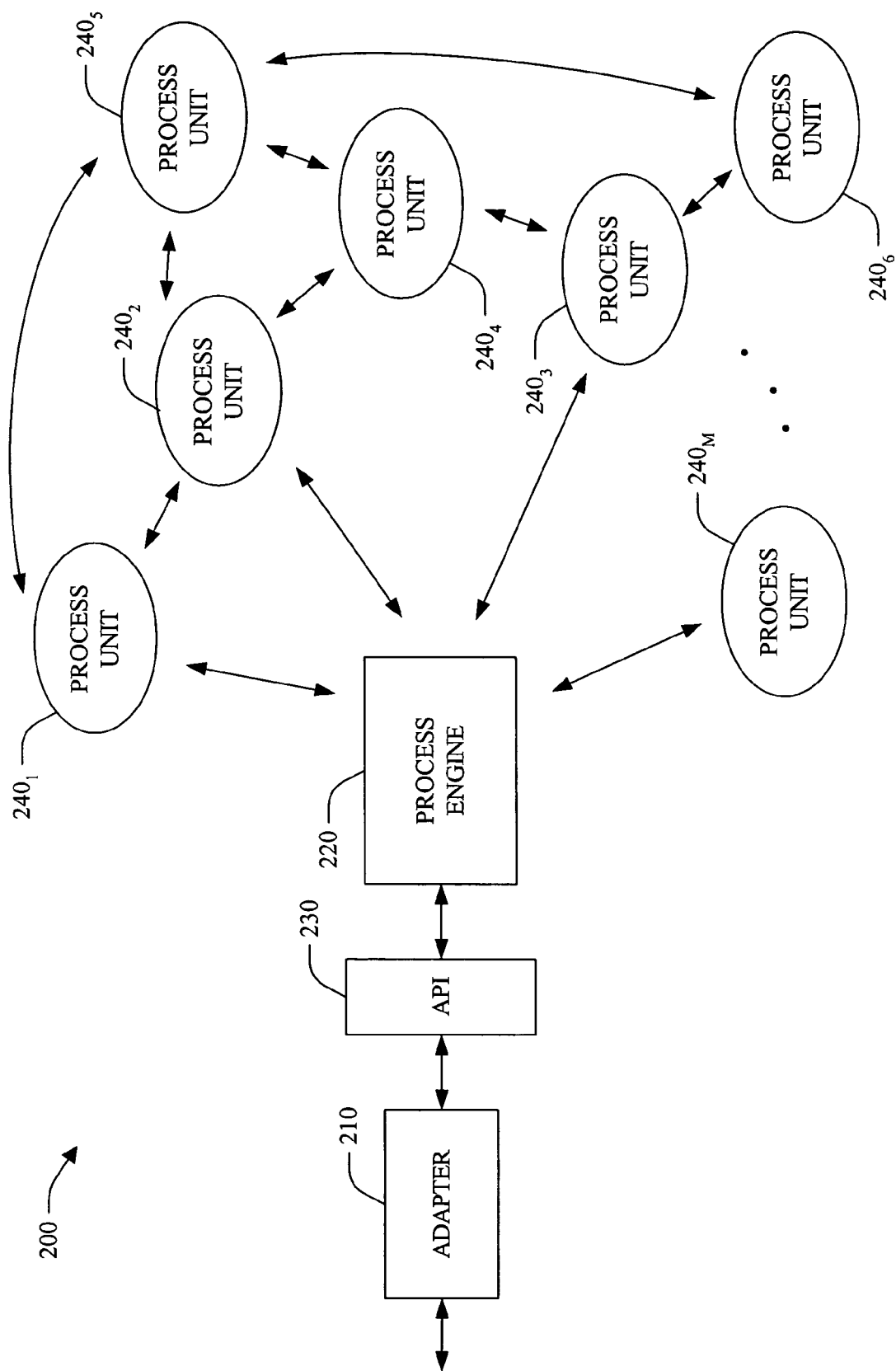
FIG. 2 illustrates an exemplary system that asynchronously processes synchronous requests via a plurality of processing units, in accordance with an aspect of the present invention.

FIG. 2 illustrates a system 200 that asynchronously processes synchronous requests, in accordance with an aspect of the present invention. The system 200 comprises an adapter 210 that interfaces with clients and a process engine 220 that routes requests from such clients to a plurality of processing units that process and return results via the adapter 210 back to respective clients.

The adapter 210 can include a synchronous and/or an asynchronous query interface. The synchronous query interface can be utilized to receive synchronous requests from clients. It is to be appreciated that the synchronous query interface can comprise a pluggable component or object instance that communicates over a network with clients via various known protocols (e.g., TCP/IP, IPX/SPX, UDP/IP, HTTP, FTP, SOAP, etc.) and proprietary protocols. Thus, the adapter 120 can be utilized to interface legacy systems, Web-based systems and/or other synchronous-based system in order to receive and facilitate servicing synchronous requests.

Requests transmitted to the adapter 210 can be conveyed to the process engine 220 through an API 230. Once a request is received, the process engine 220 can publish the request, for example, within a queue. In addition, information indicative of the querying client, the adapter 210, the process engine 220, the connection type, and/or the queue, for example, can be generated, saved and associated and/or published with the request. Such information can be utilized to facilitate tracking a request during processing and/or returning processing results to the process engine 220, correlating such results with a corresponding request and returning aggregated results to the client.

It is to be appreciated that more than one process engine can be employed in accordance with an aspect of the present invention. For example, multiple process engines, including the process engine 220, can be employed, wherein such process engines can compete for the request. In one instance, the process engine with the lowest load can be selected to service the request. In another instance, the first process engine to respond can be granted access to the request. In yet another instance, one or more of the process engines can serially and/or concurrently service the request. In still another instance, the process engine selected to service the request can be pre-determined via a priori information regarding an expected request and/or historical actions by the client.

Published requests can be obtained by one or more process units that are subscribed with the process engine 220. As depicted, a process unit $240_1$, a process unit $240_2$, a process unit $240_3$, and a process unit $240_M$ (where M is an integer) can receive the request or portions thereof from the process engine 220. However, it is to be appreciated that the request can be parsed amongst a subset (e.g., one or more, but less than all) of subscribed process units. Such parsing can be based on process unit load such that the portion of request provided to a process unit typically is in proportion to the process unit's present load. Since process unit load can change over time, the portion being transmitted to a process unit can change dynamically. For example, if the process unit load decreases as request information is streamed to the process unit, the portion can be adjusted (e.g., increased) to exploit the increase in processing ability. In another example, if the process unit's load increases, for example, due to servicing another request, the portion being conveyed to the process unit can be decreased, if permissible.

In addition, portions of a request that have been conveyed to any of the process units $240_1$, $240_2$, $240_3$ and $240_M$ can be redistributed amongst one another and/or to a process unit $240_4$, a process unit $240_5$, and a process unit $240_6$. Similar to the above-described parsing, delineation of portions of the request can be distributed to the process units $240_4$, $240_5$, and $240_6$ based on load, first to respond, and other criteria. Furthermore, since present load can change over time, request portions being operated on can be redistributed according to any changes in load. Moreover, process units $240_1$-$240_M$ can utilize respective queues that can store information indicative of the querying client, the adapter 210, the process engine 220, the connection type, and/or the queue. Such information can be utilized to facilitate tracking the request during processing and/or returning processing results, correlating such results, and returning aggregated results to the client.

It is to be appreciated a process unit's subscription can dynamically change. For example, a process unit (e.g., process unit $240_4$) that at one moment is not subscribed can subscribe. Such subscription can be utilized to adjust the distribution of the request to include the newly subscribed process unit. Moreover, it is to be appreciated that any number of process units can convey and/or operate at least partially on the request and/or portion of the request.

In view of the above, it is noted that the system 200 provides for dynamic load balancing (e.g., process equilibrium) and asynchronous processing amongst process units. Such novel approach can be utilized to optimize processing across process units, based on load. In addition, since the process engine 220 distributes the initial request and/or portion thereof, such asynchronous distribution and processing can be transparent to the client.

Respective results from any process unit employed can be returned to the process engine 220, wherein the results can be correlated to an associated request. As noted previously, information indicative of the querying client, the adapter 210, the process engine 220, the connection type, and/or the queues, can be utilized to facilitate returning results to the process engine 220 as well as correlating such results with the associated request. In addition, such information can be utilized to return aggregated results to the client in a synchronous manner. The foregoing novel technique of correlating and aggregating results within the system 200 provides for seamless asynchronous processing that can mitigate any need for the client to implement a client-side asynchronous results matching scheme; and thus, can reduce consumption of client processing cycles and memory, mitigate overhead and increase service time.

Figure 3:
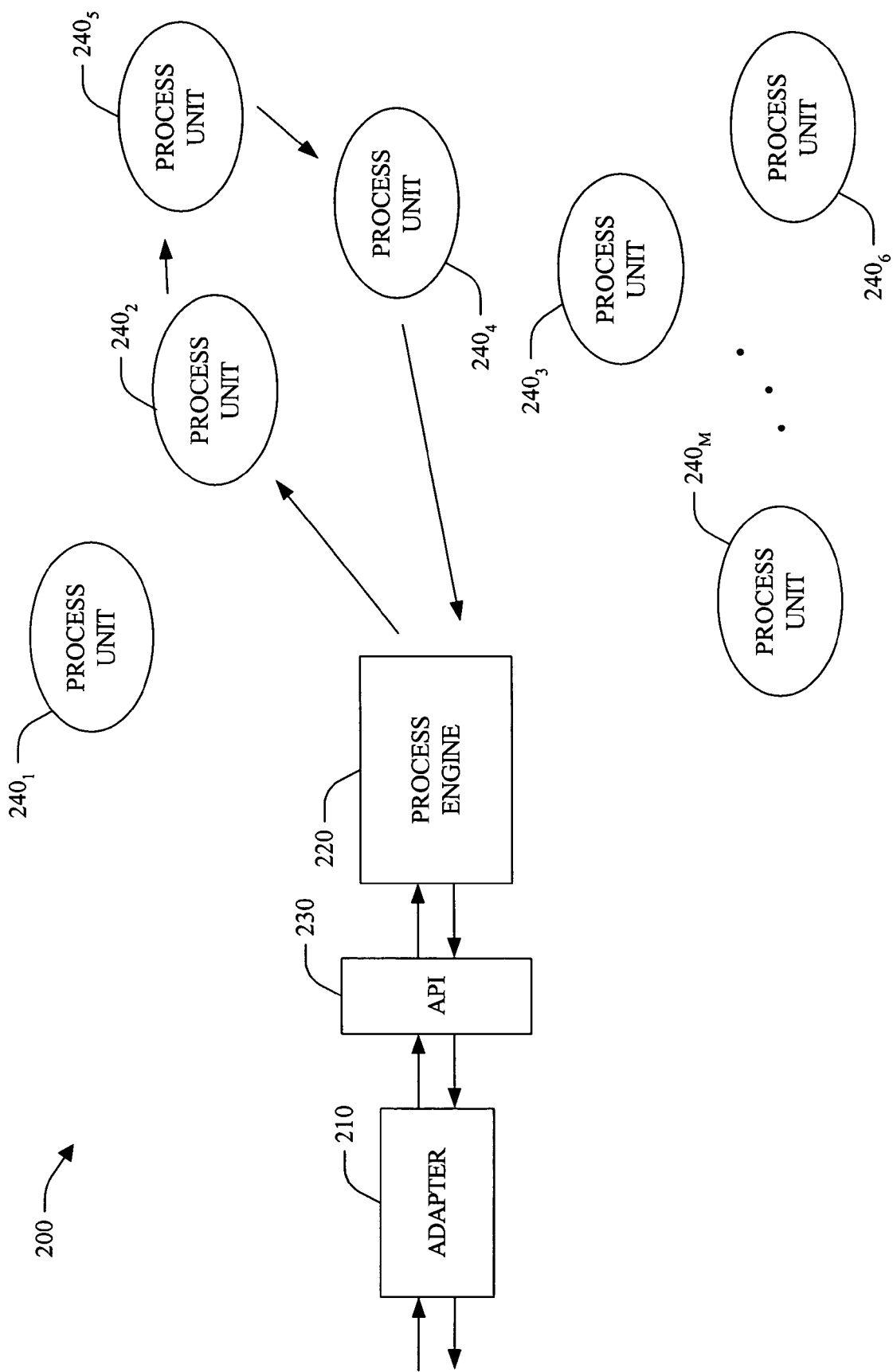
FIG. 3 illustrates an exemplary serial technique for asynchronous request processing via a plurality of processing units, in accordance with an aspect of the present invention.

FIG. 3 illustrates the system 200 wherein an exemplary technique of serial asynchronous processing is employed, in accordance with an aspect of the present invention. As depicted, a request is transmitted to adapter 210. The adapter 210 conveys the request to the process engine 220 through the API 230. After determining that process unit $240_2$ will begin processing the request (e.g., based on load balancing), the request is conveyed to the process unit $240_2$. During processing, the system 200 can dynamically analyze the process units and the request to determine whether the process unit $240_2$ should continue processing or whether the remainder of the request should be forwarded to another process unit. As illustrated, the request is conveyed to the process unit $240_5$ for further processing. Then, the request is conveyed to the process unit $240_4$ where processing is completed. The results from any process unit can then be aggregated via the process engine 220 and returned as a synchronous result to the client through the API 230 and adapter 210.

Figure 4:
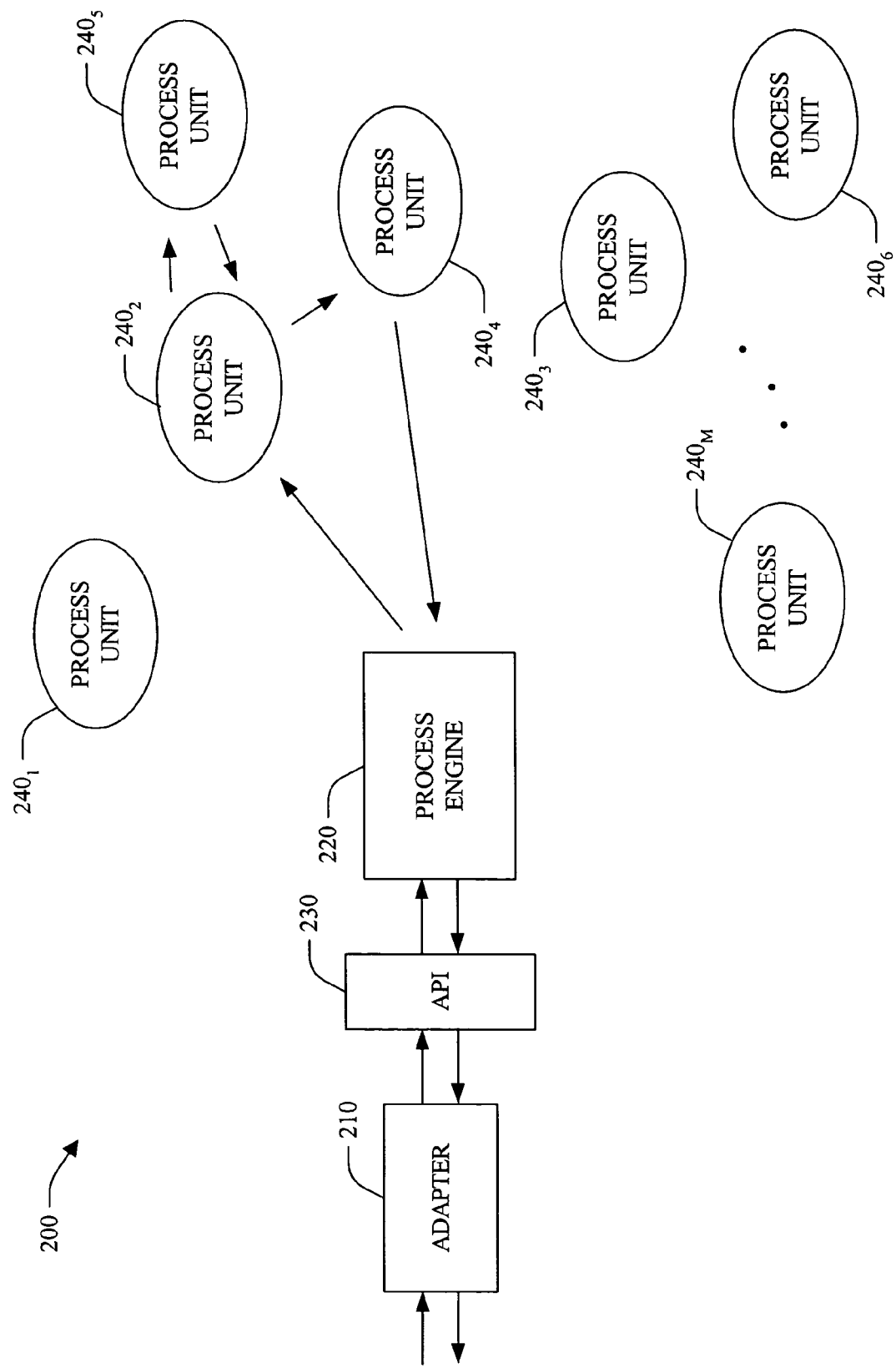
FIG. 4 illustrates an exemplary multi-unit technique for asynchronous processing via a plurality of processing units, in accordance with an aspect of the present invention.
Figure 5:
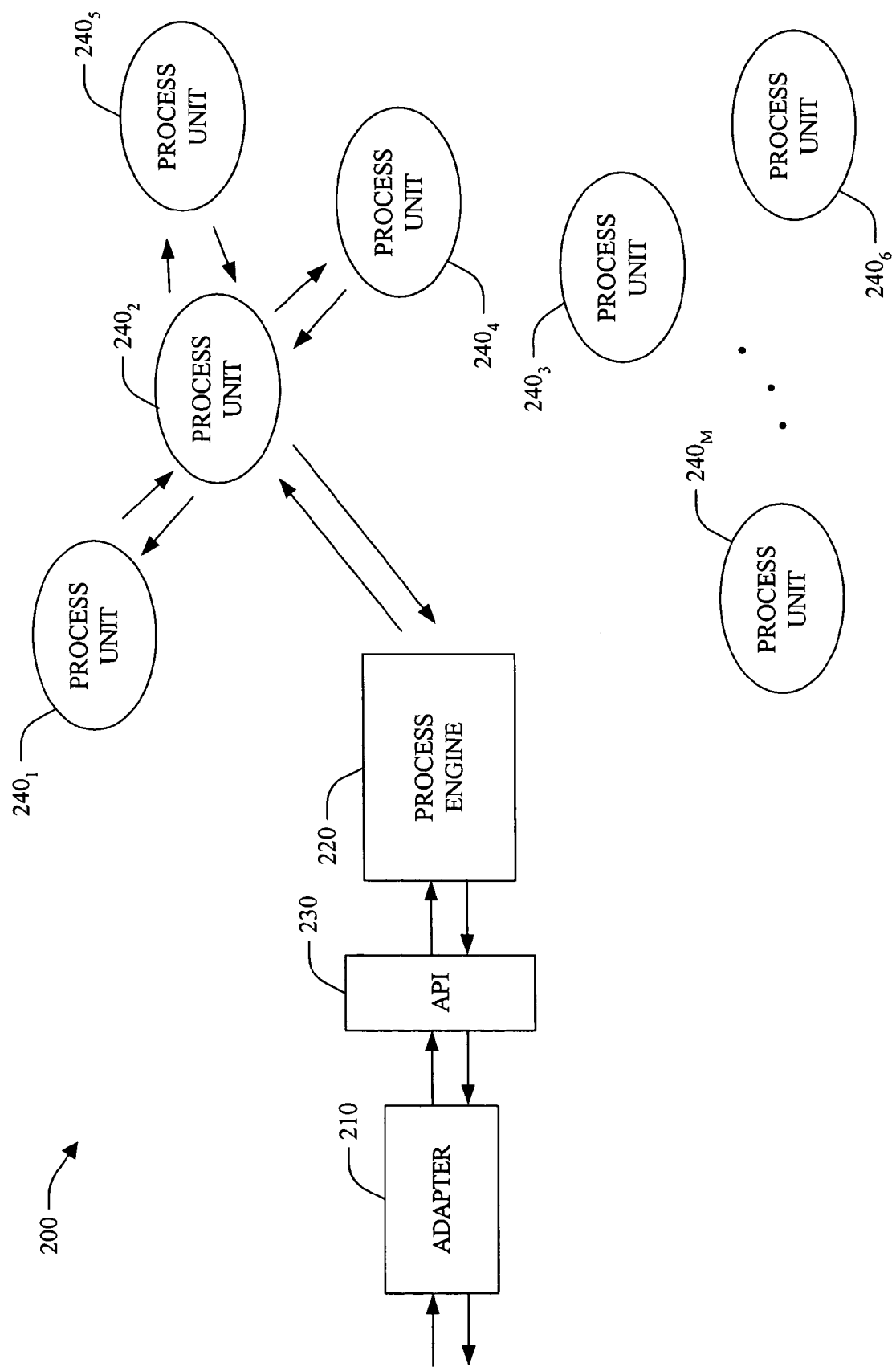
FIG. 5 illustrates an exemplary concurrent asynchronous processing technique via a plurality of processing units, in accordance with an aspect of the present invention.

FIG. 4 illustrates the system 200 wherein the process unit $240_2$ is employed to the process the request more than once and in a non-contiguous manner. As depicted, the process unit $240_2$ commences request servicing and then conveys the request to the process unit $240_5$. The request is returned to the process unit $240_4$ to finish processing. Asynchronous results are returned to the process engine 220, aggregated, and a synchronous result can be returned to the client through the API 230 and adapter 210. FIG. 5 illustrates the system 200 wherein the process unit $240_2$ is selected to begin processing the request. Then, the request is parsed amongst process units $240_1$, $240_2$, $240_5$ and $240_5$. After processing, asynchronous results are returned, grouped and conveyed as a synchronous result to the requesting client.

Figure 6:
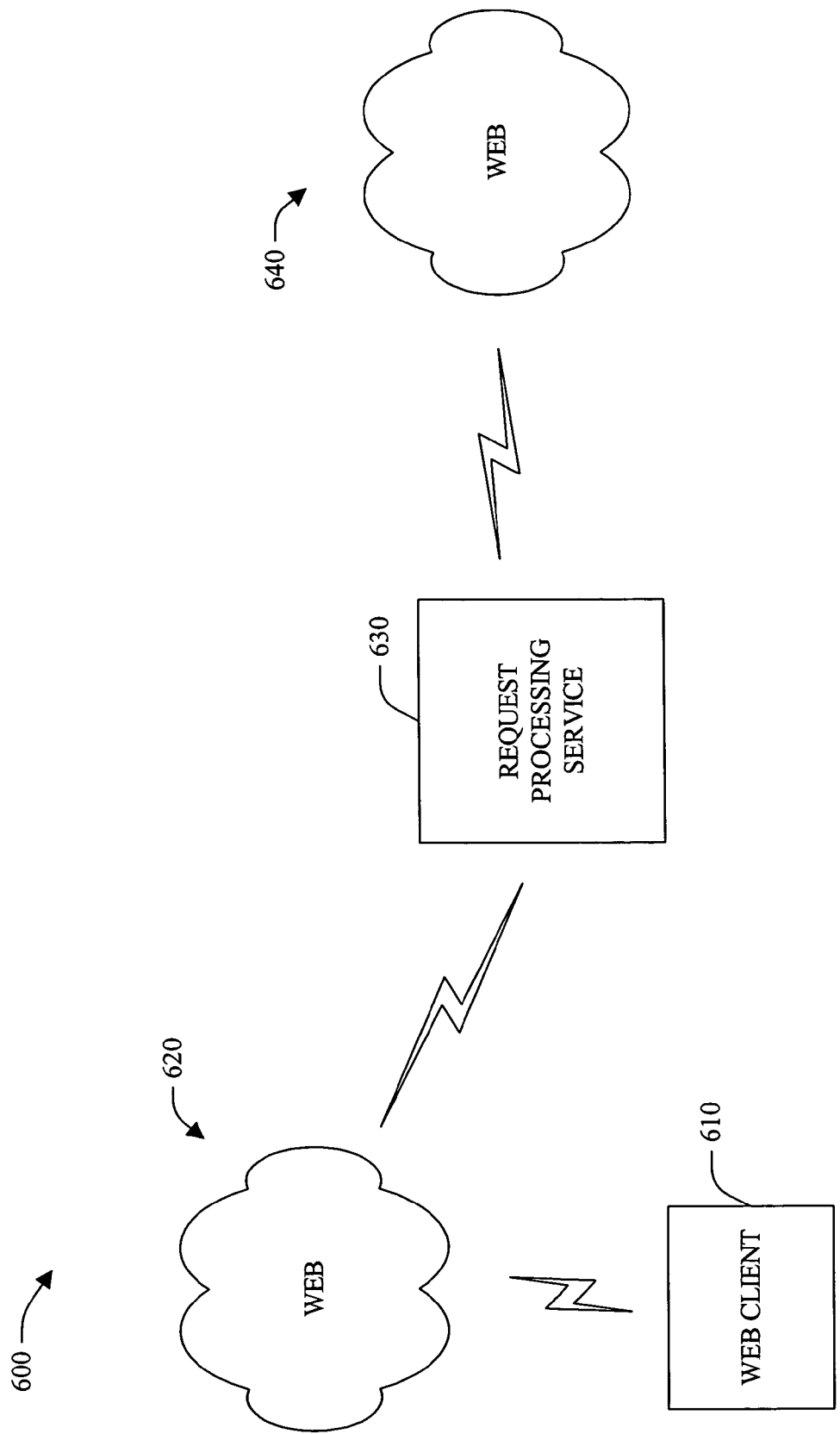
FIG. 6 illustrates an exemplary Web-based asynchronous process service that dynamically processes synchronous requests, in accordance with an aspect of the present invention.

FIG. 6 illustrates a system 600 that provides a Web-based asynchronous process service, in accordance with an aspect of the present invention. The client 610 can establish a session with a network via any known technique. For example, the client 610 can be essentially any microprocessor-based system that can interface with a network. For example, the client 610 can be a personal computer (e.g., desktop, mini-tower and tower), a mainframe computer, a laptop, a notepad, a palm pilot, a handheld, a tablet PC, a personal data assistant, cell phone, a terminal (e.g., "dumb" terminal), an HMI, and the like. In addition, the client 610 can include off-the-shelf and/or specialized (e.g., proprietary) software and/or hardware such as accelerators, dedicated processing chips and high-speed communication channels that can increase performance, enhance user capabilities, increase transmission and rendering rates and improve aesthetics. Furthermore, firmware can be utilized to provide low-level executable instructions, parameters and/or control code, and provide a flexible means to upgrade and/or revise hardware functionality and performance.

A user can employ the client 610 to access a Web-based network 620, which can be an intranet, an internet and/or the Internet. Such access can be achieved via wire (e.g., CAT5, USTP, 8-wire and coaxial cable), optical fiber, IR transmission and/or RF technologies, for example. A user can then invoke a Web-base interface from the client 610, wherein the Web-based interface can facilitate interaction between the client 610 and the Web. The Web-based interface be a Web browser and can comprise an application or a portion of an application that executes in connection with one or more components. For example, the Web-based interface can be code executing within or under the control of one or more of the aforementioned microprocessor-based components, wherein the code can reside in local memory such as any suitable type of RAM or ROM, virtual memory, hard disk, etc. and/or an external storage such as CD, DVD, optical disk, floppy disk, tape, memory stick, portable hard drive, etc.

From the Web-based interface, the user can transmit a query to the request processing service 630. It is to be appreciated that the request processing service can comprise systems 100-500 described above. Thus, the user can submit a synchronous request that can be serviced by the request processing service 630 in a dynamic and asynchronous manner. For example, the request can be processed by one or more service engines that have subscribed to service the request. Such processing can include partial processing by respective service engines, including serially processing wherein the request is conveyed between service engines based on engine load and/or parallel processing wherein the request can be parsed and distributed across a plurality of service engines to be processed.

In addition, any service engine can convey the request or a portion of the request to another service engine residing outside of request processing service 630 via the Web-based network 640. Similar tracking techniques can be utilized to return results over the Web 640 and back to the request processing service 630 and over the Web 620 and back to the Web client 610. For example, information indicative of the request processing service 630, the request, any service engine, the client and/or the connection type can be utilized to return results. In addition, such information can be employed to facilitate correlating results with the request and conveying an aggregated synchronous result to the Web client 610.

Figure 7:
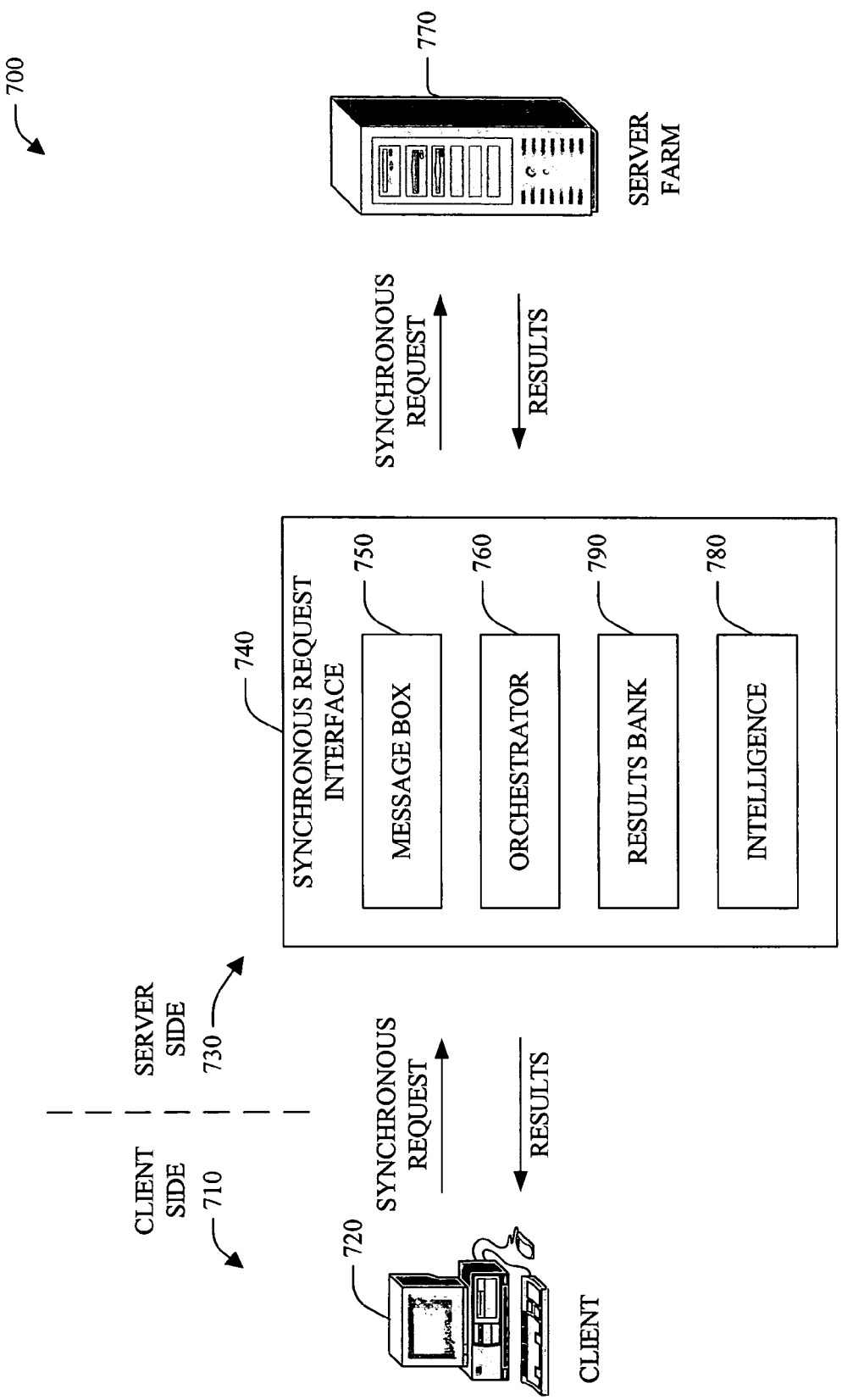
FIG. 7 illustrates an exemplary system that asynchronously processes synchronous requests via servers within a Web server farm, in accordance with an aspect of the present invention.

FIG. 7 illustrates a system 700 that asynchronously processes synchronous requests within a server farm, in accordance with an aspect of the present invention. The system 700 comprises a client side 710. The client side 710 includes a client 720. The client 720 can be any microprocessor-based device, as described previously.

In one aspect of the present invention, an interface can be invoked within the client 720 to facilitate communication with a server side 730. The interface can be a graphical user interface (GUI) or Web browser, for example. As such, the interface can comprise mechanisms (e.g., input and output) that facilitate communication and/or interaction over a network. For example, the interface can comprise text and/or graphic presenting (e.g., output) regions comprising dialogue boxes, static controls, drop-down-menus, list boxes, pop-up menus, and graphic boxes. The presenting regions can further include utilities to facilitate display. For example, the presenting regions can include vertical and/or horizontal scroll bars to facilitate navigation and toolbar buttons to determine whether a region will be viewable, and to adjust zoom, orientation and/or color/gray scale. A user can interact with the presenting regions to view, select and provide information via various devices such as a mouse, a roller ball, a keypad, a keyboard, a pen and/or voice activation, for example.

Input regions utilized to transmit information can employ similar mechanisms (e.g., dialogue boxes, etc.) and, in addition, utilities such as edit controls, combo boxes, radio buttons, check boxes and push buttons, wherein the user can employ various input devices (e.g., the mouse, the roller ball, the keypad, the keyboard, the pen and/or voice activation) in connection with the mechanism and utilities. For example, the user can provide a parameter or variable, or pointer thereto (e.g., a register location) via entering the information into an edit control box and/or highlighting an associated check box. Typically, a mechanism such as a push button is employed subsequent to entering the information in order to initiate conveyance of the information. However, it is to be appreciated that the invention is not so limited. For example, merely highlighting the check box can initiate information conveyance.

In addition or alternatively, the interface can include command-line functionality. For example, a command line can be employed to prompt for information via a text message and/or audio tone. The operator can then provide suitable information, such as alpha-numeric input corresponding to an option provided in the interface prompt or an answer to a question posed in the prompt. In another aspect of the present invention, a value, set of values or a stream of values can be presented to the user in the command line interface.

The above-noted interface can be utilized by a user to initiate a synchronous query. For example, the user can transmit a query in the form of a synchronous request. Such request can be received on the server side 730 by a synchronous request interface 740. The received request can be stored within a message box 750, along with other received request.

In addition, indicia indicative of the request can be generated and stored, and utilized to differentiate between requests. An orchestrator 760 can facilitate conveying stored requests to a server farm 770 for processing. The orchestrator 760 can employ a technique wherein it can determine the load associated with any server within the server farm 770. The orchestrator 760 can then convey the request and/or portions thereof to suitable servers within the server farm 770. For example, the orchestrator 760 can provide the request to the server farm beginning with the server with the lowest load and ending with a server with a greater load. Thus, the orchestrator 760 can balance processing across servers based on load. In addition, the orchestrator 760 can monitor any processing and facilitate communication between farm servers. For example, a portion of the request can be transmitted from one server to another server with a lower load, for example, after a load threshold is met, in order to process the portion more efficiently.

It is to be appreciated that the orchestrator 760 can employ intelligence to facilitate decision-making, for example, via an intelligence component 780. Such intelligence can be based on statistics, inferences, probabilities and classifiers (e.g., explicitly and implicitly trained), including but not limited to, Bayesian learning, Bayesian classifiers and other statistical classifiers, such as decision tree learning methods, support vector machines, linear and non-linear regression and/or neural networks. The intelligence can be utilized to track a request or portion of request as it traverses through servers and is processed. In addition, the intelligence can be employed to maintain an association between any portions. Furthermore, the intelligence can be utilized to facilitate determining server load and the "best" server to process a particular portion of request.

The servers within the server farm 770 can employ serial and/or concurrent techniques to asynchronously process a request. For example, the request can serially travel through one or more servers wherein a portion of the request is serviced within respective servers. In another example, the request can be parsed and parallel processed by one or more servers.

Results from the processing can be returned to the synchronous request interface 740 and stored within the results bank 790. The results in the results bank 790 can be associated with one or more request. The synchronous request interface 740 can utilize the indicia indicative of the request and/or the intelligence 780 to correlate results with a corresponding request. The correlated results can be returned to client 720 as a synchronous result to fulfill the user request. It is to be appreciated that the 740 can also return error information and/or mitigate processing error, as described above.

Figure 8:
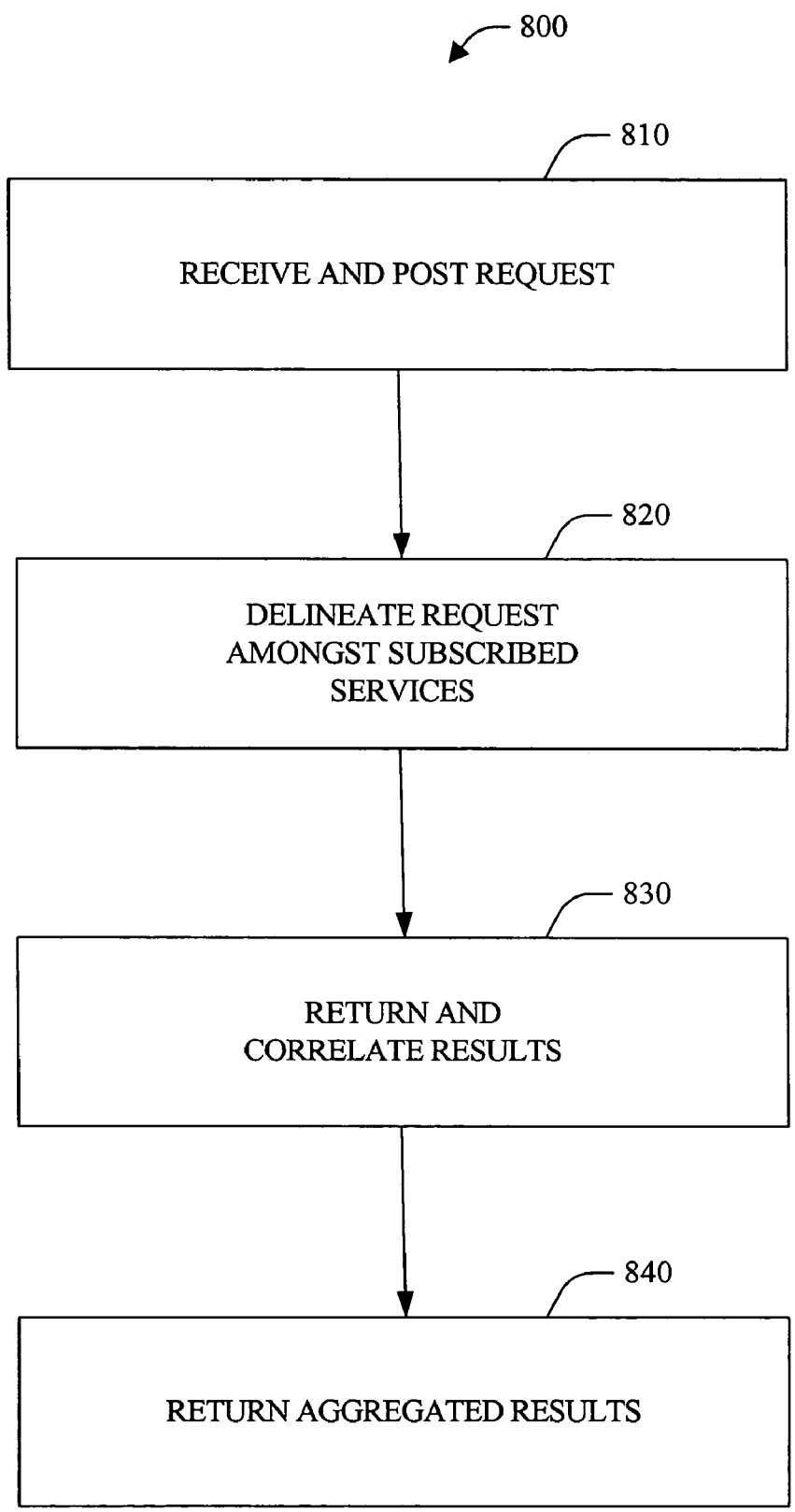
FIG. 8 illustrates an exemplary methodology for asynchronously processing synchronous requests via a dynamic balancing approach, in accordance with an aspect of the present invention.
Figure 9:
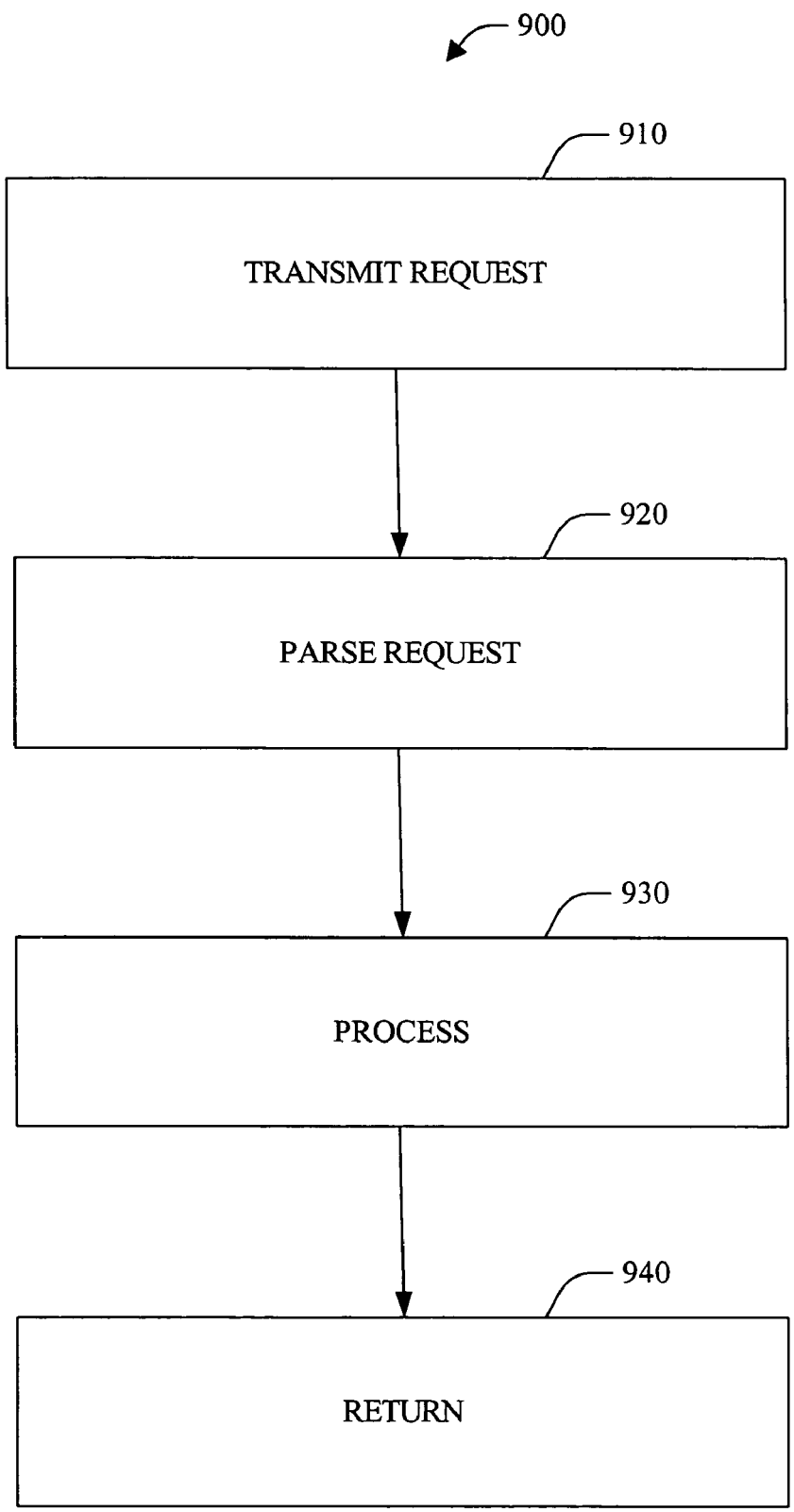
FIG. 9 illustrates an exemplary methodology for submitting a synchronous request that is asynchronously processed via a dynamic load balancing, in accordance with an aspect of the present invention.
Figure 10:
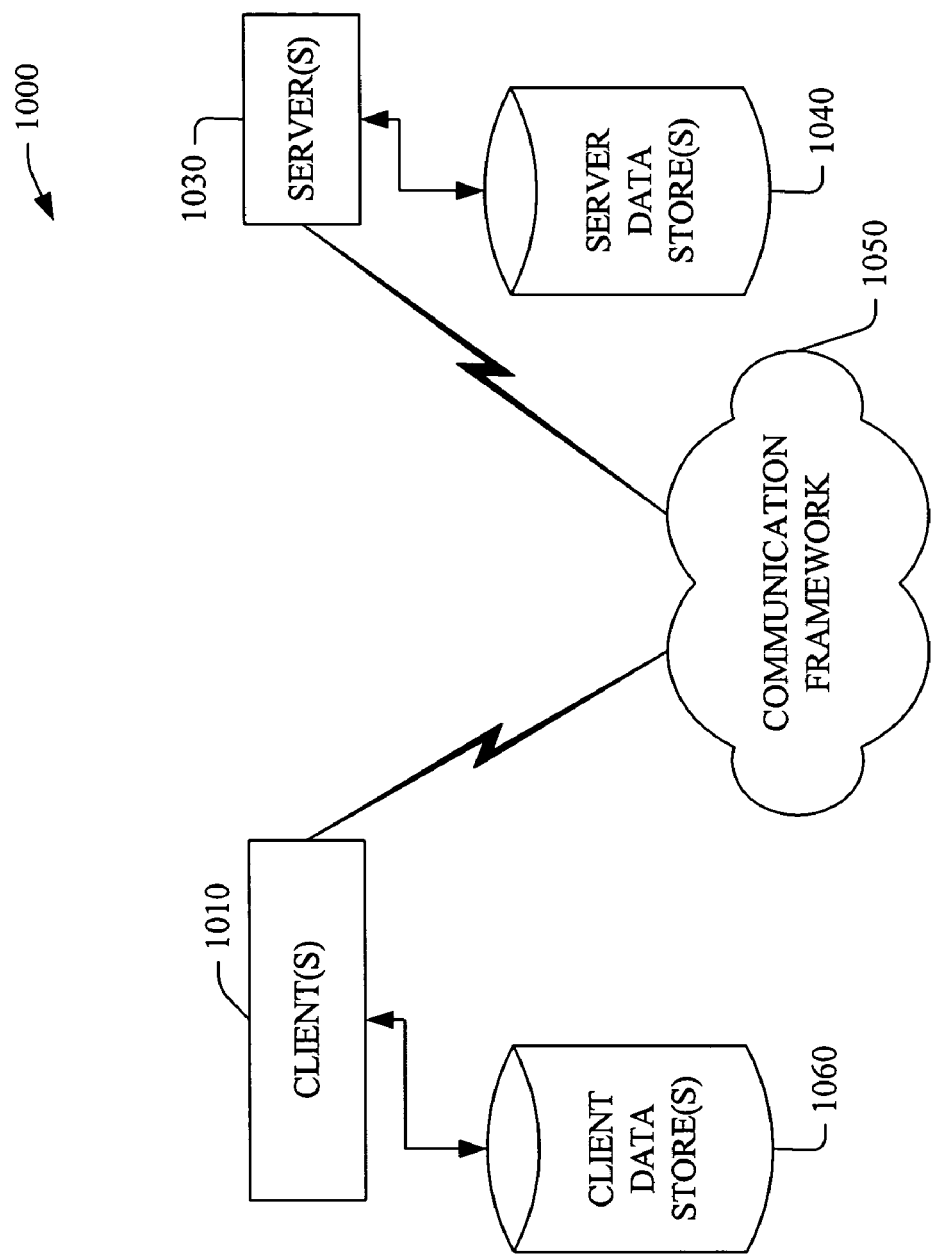
FIG. 10 illustrates an exemplary networking environment, wherein the novel aspects of the present invention can be employed.

FIGS. 8-10 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

Proceeding to FIG. 8, a method 800 for receiving a synchronous request, processing the request asynchronously and synchronously returning a result is illustrated, in accordance with an aspect of the present invention. At reference numeral 810, a synchronous request is received. Such request can be posted, wherein any subscribed processing engine can retrieve and process at least a portion of the request. In one aspect of the present invention, the processing engine that first obtains the request is provided with access to service the request. Other processing engines can be denied or placed on a waiting list in case the processing engine fails and is unable to the process the request. In anther aspect of the present invention, more than one processing engine can obtain and process the request. Returned results can be utilized for error checking and/or discarded.

At reference numeral 820, the request can be delineated across subscribed services associated with a process engine that retrieved the request. Such services can include Web-based services and can serially and/or concurrently process at least a portion of the request. In addition, such services can interact with one another, thereby enabling the request and/or portions thereof to be conveyed and processed amongst multiple services.

At 830, processing results can be returned. Such results can be correlated with request in order separate results between processed requests. At 840, correlated results can be grouped and returned to the requester. It is to be appreciated that information indicative of the requester, the request and the processing engine can be maintained in order to facilitate return results to the requester. In addition, it can be appreciate the intelligence can be utilized to facilitate selecting a process engine, distributing portions of the request amongst a plurality of services, correlating results and returning a synchronous result to the requester.

FIG. 9 illustrates a method 900 for asynchronously processing a synchronous request, in accordance with an aspect of the present invention. At 910, a synchronous request is transmitted. For example, many legacy and conventional systems are designed for synchronous interaction, wherein a user can initiate a synchronous query and a synchronous result is received. At reference numeral 920, the synchronous request is parsed amongst servers within a server farm for processing. Such serves can be accessed via an API and typically are identified via a service subscription. In general, parsing is based on server load and can be dynamic in nature. Thus, the request can be distributed across servers to balance processing and the distribution can be dynamically adjusted to maintain a processing equilibrium. At 930, the request is processed via the servers. Respective server results can be correlated to a corresponding request. At 940, such results can be returned to the requester.

Figure 11:
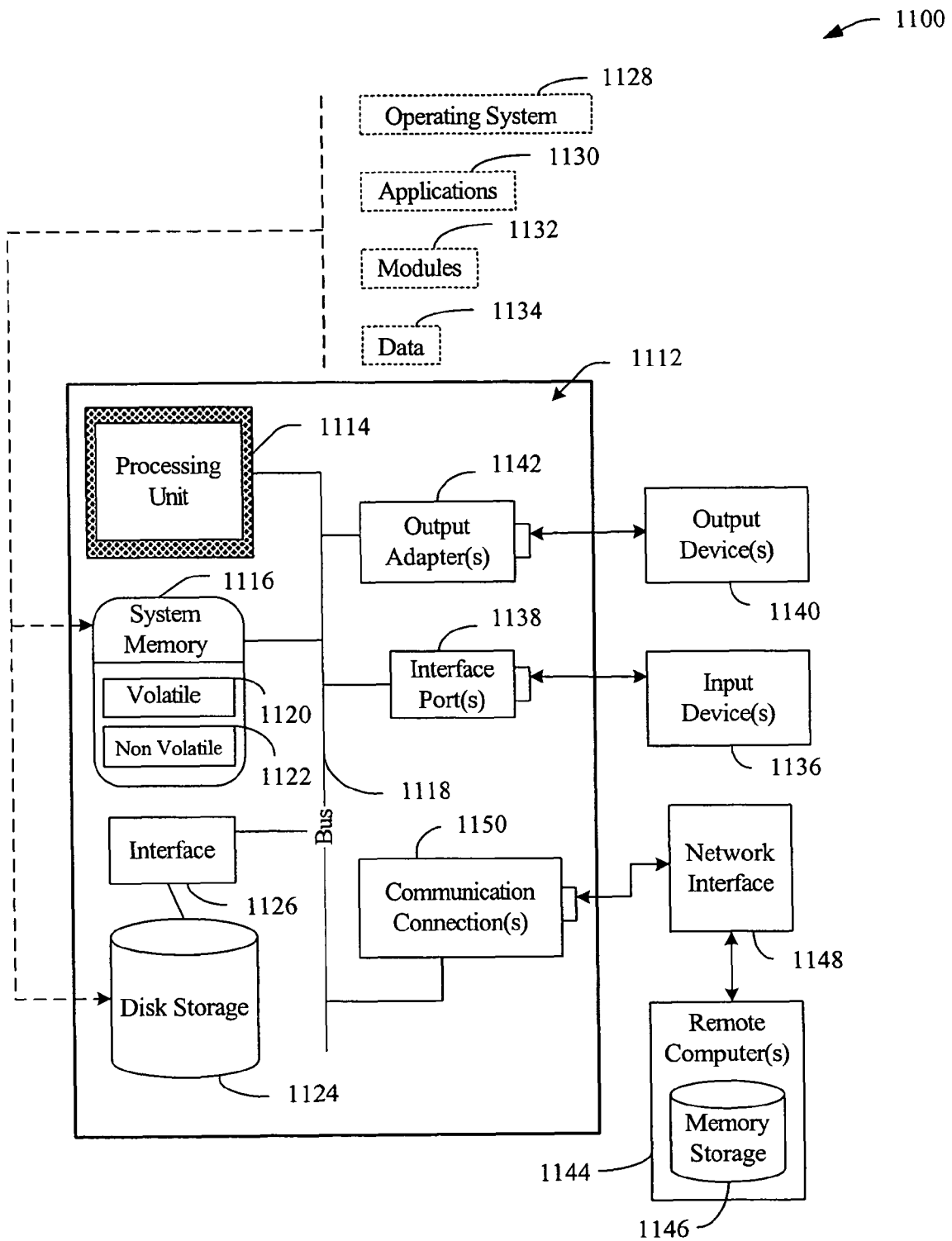
FIG. 11 illustrates an exemplary operating environment, wherein the novel aspects of the present invention can be employed.

In order to provide a context for the various aspects of the invention, FIGS. 10 and 11 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 can be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCD), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the illustrated aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that employs dynamic load balancing to asynchronously process synchronous requests, comprising:
   one or more microprocessors that execute the following computer executable components stored on a non transitory computer readable storage medium:
   a query management component that:
      receives a web-based request from a client; and
      publishes the web-based request in a queue;
   an asynchronous processing component that:
      detects available processing engine capacity;
      predicts future processing engine capacity; and
      distributes portions of the web-based request among processing engines based on the detected and predicted processing engine capacity, including distributing a same portion of the web-based request to a plurality of different processing engines, such that each of the different processing engines in the plurality of processing engines returns a result for the same portion of the web-based request, whereafter a first result returned from the plurality of processing engine is initially selected for use;

an error handling component that automatically determines if the first result returned is in error and uses a subsequent result returned from the plurality of processing engines if available, and discards the first result if the first result is in error or discards subsequent results when the first result returned is not in error, or if subsequent results are not available, conveys one or more portions of the web-based request associated with a failed processing engine to another processing engine, wherein the client is not informed of a processing failure;

a process engine component that groups processing engine results;

an output component that returns the grouped processing engine results synchronous with the web-based request; and an orchestrator component that tracks and maintains one or more associations between the portions of the web-based request as the portions of the web-based request traverse through the processing engines.

2. The system of claim 1, further comprising an adapter that translates the web-based request received via TCP/IP, IPX/SPX UDP/IP, HTTP, SOAP, or a proprietary synchronous protocol and conveys the translated web-based request to the processing engine component through an application processing interface (API).

3. The system of claim 2, wherein the adapter is one of a pluggable software component or an instance of an object.

4. The system of claim 3, wherein the queue is utilized to store information related to a type of connection through which the web-based request was received in order to track the web-based request during processing.

* * * * *